United States Patent [19]
Yano et al.
[11] Patent Number: 4,675,693
[45] Date of Patent: Jun. 23, 1987

[54] LIQUID INJECTION RECORDING METHOD IN WHICH THE LIQUID DROPLET VOLUME HAS A PREDETERMINED RELATIONSHIP TO THE AREA OF THE LIQUID DISCHARGE PORT

[75] Inventors: Yasuhiro Yano, Kawasaki; Masahiro Haruta, Funabashi; Toshitami Hara, Tokyo, all of Japan

[73] Assignee: Canon Kabushiki Kaisha, Tokyo, Japan

[21] Appl. No.: 807,116

[22] Filed: Dec. 10, 1985

Related U.S. Application Data

[63] Continuation of Ser. No. 573,479, Jan. 24, 1984, abandoned.

[30] Foreign Application Priority Data

Jan. 28, 1983 [JP] Japan ................................ 58-13545
Jan. 28, 1983 [JP] Japan ................................ 58-13546

[51] Int. Cl.⁴ ............................................ G01D 15/18
[52] U.S. Cl. ................................ 346/1.1; 346/140 R
[58] Field of Search ................................ 346/1.1, 140

[56] References Cited

U.S. PATENT DOCUMENTS 4,243,994 1/1981 Kobayashi ........................ 346/140
4,295,889 10/1981 Eida ................................ 346/140 X
4,334,234 6/1982 Shirato et al. ...................... 346/140
4,339,762 6/1982 Shirato et al. ...................... 346/140
4,376,945 3/1983 Hara .................................. 346/140
4,490,728 12/1984 Vaught .......................... 346/140 X

*Primary Examiner*—Joseph W. Hartary
*Attorney, Agent, or Firm*—Fitzpatrick, Cella, Harper & Scinto

[57] ABSTRACT

In a liquid injection recording method, recording is effected in such a manner that the relation between the minimum cross-sectional area So of droplet discharge ports for forming flying droplets and the volume V of the droplets discharged from the droplet discharge ports is $100 \geqq V/So^{3/2} \geqq 0.1$. Also, in a liquid injection recording apparatus, the relation that $0.1.S_H \leqq So^{3/2} \leqq 100.S_H$ is satisfied between the numerical value of the minimum cross-sectional area So of a discharge orifice for forming flying droplets and the numerical value of the heater area $S_H$ of an electro-heat converting member for providing energy for causing liquid to be discharged from the discharge orifice.

1 Claim, 6 Drawing Figures

LIQUID INJECTION RECORDING METHOD IN WHICH THE LIQUID DROPLET VOLUME HAS A PREDETERMINED RELATIONSHIP TO THE AREA OF THE LIQUID DISCHARGE PORT

This application is a continuation, of application Ser. No. 573,479 filed Jan. 24, 1984, now abandoned.

BACKGROUND OF THE INVENTION

1. Field of the Invention

This invention relates to a liquid injection recording method and apparatus, and more particularly to a liquid injection recording method and apparatus which can effect stable droplet discharge even during continuous recording.

2. Description of the Prior Art

Non-impact recording methods have recently been attracting attention in that the noise occurring during recording is negligible.The so-called ink jet recording method (liquid injection recording method) which is capable of high-speed recording and of accomplishing recording without requiring any special process such as fixation on plain paper is a very effective recording method and various variants of it have heretofore been devised. Some of them have already been put into commercial use and some of them are being studied for practical implementation.

The liquid injection recording method is such that droplets of recording liquid called ink are caused to fly and adhere to a recording medium, thereby accomplishing recording, and such method is broadly classified into several types depending on the method of creating the droplets of recording liquid and the method of controlling the direction in which the created droplets fly.

The so-called drop-on-demand recording method, which causes droplets to be discharged and fly from discharge orifices (liquid discharge ports) in response to a recording signal and causing the droplets to adhere the surface of a recording, medium to thereby accomplish recording discharges only the droplets necessary for recording and therefore is nowadays particularly attracting attention due to the fact that any special means for collecting or treating the discharged liquid unnecessary for recording need not be provided. This in turn may lead to simplification and compactness of the apparatus itself, since the direction in which the droplets discharged from the discharge orifices fly need not be controlled and multi-color recording can be easily accomplished.

Also, in recent years, the development of recording heads (liquid injection recording heads) of the full line type with highly dense multiple orifices which uses the above-described drop-on-demand recording method has been remarkable and numerous liquid injection recording apparatus which can obtain images of high resolution and high quality at high speeds have also been developed.

In a liquid injection recording apparatus using the drop-on-demand recording method, pressure energy (mechanical energy) or heat energy is caused to act on the liquid present in the energy acting portion to thereby obtain the motive force for droplet discharge. Accordingly, it is necessary that such energy act on the liquid so as to be efficiently consumed for droplet discharge.

Also, where recording is to be executed continuously, it is necessary that the creation of such energy take place repetitively exactly in response to a recording signal. Particularly in the case of high-speed recording, it is necessary that such repetition be effected faithfully responsive to the recording signal imparted to the energy acting portion.

To enhance the quality of recorded images and enable high-speed recording to be accomplished, it is necessary to stabilize the direction of discharge of droplets, to prevent occurrence of satellites, to have droplet discharge executed stably, continuously and repetitively for a long time and to improve the droplet formation frequency (the number of droplets formed per unit time).

However, liquid injection recording apparatus using the drop-on-demand recording method has suffered from a problem that when the volume of droplets relative to the size of liquid discharge ports is very great, much liquid flies due to the discharge of droplets and therefore air is introduced from the droplet discharge ports when the retreat of the meniscus occurs. If air is introduced into the recording head, particularly into the energy acting portion for imparting discharge energy to the liquid or the vicinity thereof and thereby air is present as bubbles in the liquid in the recording head, the energy for discharging droplets will be consumed (absorbed) in compressing the bubbles. Accordingly, in some cases, the liquid may not be imparted the energy sufficient to enable the liquid to fly from the droplet discharge ports. That is, sometimes droplets cannot be discharged due to the bubbles. Also, even if droplets can be discharged, part of the discharge energy is absorbed by the bubbles and therefore it becomes difficult to cause droplets to land accurately on a recording medium. That is, in order that stable discharge of droplets may take place. it is important to prevent the introduction of air (that is, the presence of bubbles).

As the means for preventing the air from entering the energy acting portion or the like by reducing the retreat of the meniscus even if discharge of droplets is effected, there would occur to mind a method of pressurizing the liquid and overcoming the retreating force of the meniscus. However, where such method is used, it may occur that the liquid is forced out of the droplet discharge ports by the pressure of the liquid and the advantage of the drop-on-demand recording method which does not require a liquid collecting means is lost.

As a drop-on-demand recording method utilizing heat, there is a method wherein in causing droplets to be discharged from the discharge orifices, a heat-generating resistance member or the like which is a electro-heat converting member is used to impart heat energy to the liquid and thereby cause a change of state in which the liquid imparted the heat energy involves a steep increase in volume called gasification and the liquid is discharged by the acting force based on the change of state. In this case, the droplet discharge depends on the variation in volume of bubbles when the liquid is made into bubbles by the heat energy. The variation in volume of bubbles is determined by the area of the energy acting portion such as the heat-generating resistance member. However, to obtain a stable droplet discharge characteristic, an appropriate variation in volume of bubbles is necessary relative to the minimum cross-sectional area So of the discharge orifices, because if the variation in volume is too great, phenomena such as splash and introduction of air will occur to make the droplet discharge unstable or stop the discharge and if the variation in volume is too small, the circumference of the discharge orifices will become wet with the liquid to stop the discharge or make the discharge unstable. Also, if the variation in volume is small, no bubble will be created and accordingly, any variation in volume of bubbles will not occur and therefore no droplet will be discharged.

SUMMARY OF THE INVENTION

It is an object of the present invention to provide a liquid injection recording method and apparatus which is free from the above-noted problems and is capable of accomplishing continuous recording by stably droplet discharge.

It is another object of the present invention to provide a liquid injection recording method and apparatus in which there occurs no introduction of the air from droplet discharge ports and which has an excellent continuous stable discharge performance.

It is still another object of the present invention to provide a liquid injection recording method wherein recording is effected in such a manner that the relation between the minimum cross-sectional area So of droplet discharge ports for forming flying droplets and the volume V of droplets discharged from the droplet discharge ports is $$100 \geqq V/So^{3/2} \geqq 0.1 \qquad (1).$$

It is yet still another object of the present invention to provide a liquid injection recording apparatus in which the relation that $0.1S_H \leqq So^{3/2} \leqq 100S_H$ is satisfied between the numerical value of the minimum cross-sectional area So of a discharge orifice for forming flying droplets and the numerical value of the area $S_H$ of an electro-heat converting member for providing energy for causing liquid to be discharged from the discharge orifice.

The invention will become fully apparent from the following detailed description thereof taken in conjunction with the accompanying drawings.

DESCRIPTION OF THE PREFERRED EMBODIMENTS

The present invention will hereinafter be described with respect to preferred embodiments thereof.

Figure 1:
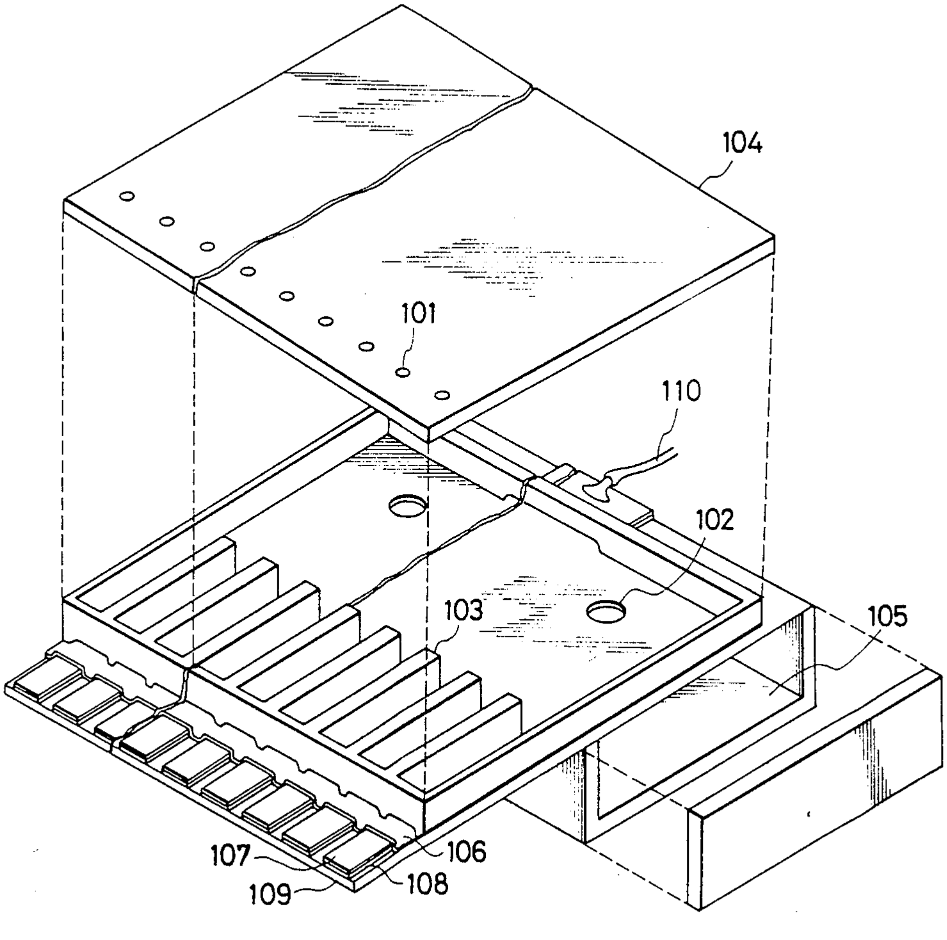
FIGS. 1 to 3 illustrate an embodiment of the present invention, FIG. 1 being a schematic perspective view of the assembly, FIG. 2 being a schematic plan view, and FIG. 3 being a schematic cross-sectional view taken along a dot-and-dash line X—X' indicated in FIG. 2.
Figure 2:
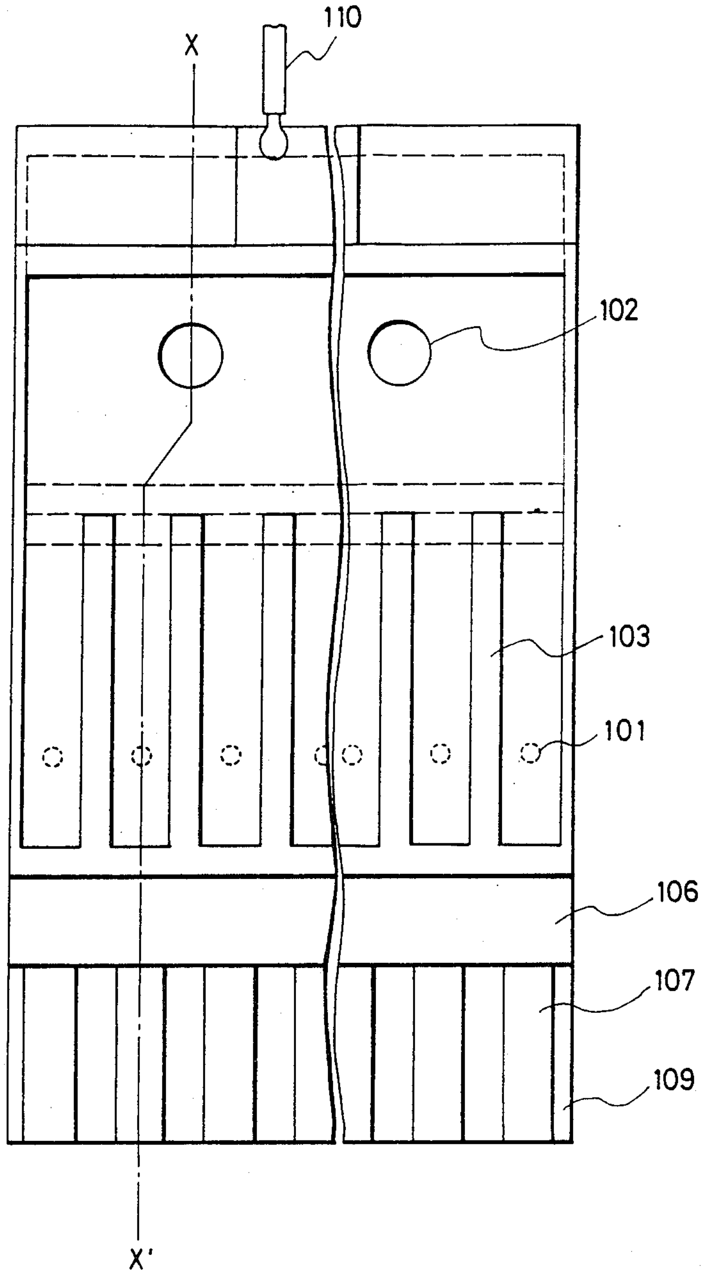
Figure 3:
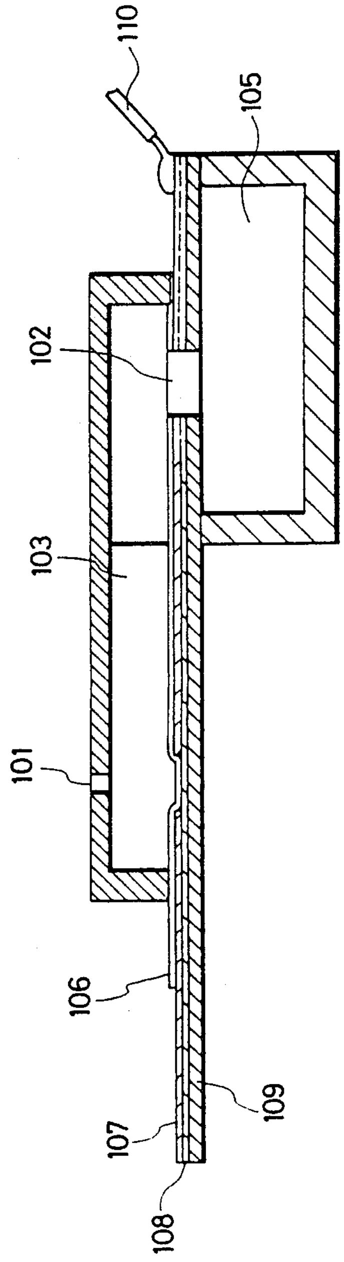

FIGS. 1 to 3 illustrate an embodiment of the present invention, FIG. 1 being a schematic perspective view of the assembly, FIG. 2 being a schematic plan view, and FIG. 3 being a schematic cross-sectional view taken along a dot-and-dash line X—X' indicated in FIG. 2. In these Figures, reference numeral 101 designate droplet discharge ports, reference numeral 102 denotes liquid supply holes, reference numeral 103 designates side walls, reference numeral 104 denotes a discharge port plate having the droplet discharge ports, reference numeral 105 designates a second common liquid chamber, reference numeral 106 denotes a protective layer, reference numeral 107 designates an electrode layer, reference numeral 108 denotes a heat-generating resistance layer, reference numeral 109 designates a base plate, and reference numeral 110 denotes a common outside wiring.

As shown, the embodiment of the present invention is a liquid injection recording apparatus of a construction wherein liquid supplied to the second common liquid chamber 105 are supplied into a common liquid chamber through the liquid supply holes 102 and the liquid is imparted heat energy by the heat-generating resistance layer 108 from liquid flow paths partitioned by the side walls 103 and is caused to fly as droplets from the droplet discharge ports.

The simple procedure of making the liquid injection recording apparatus as shown will now be described with respect to a first embodiment thereof. In the present embodiment, Si was used for the base plate 109. The surface of the base plate 109 was first heat-oxidized to form a layer of $SiO_2$ to a thickness of 3 μm. Subsequently, a layer of Ta as the heat-generating resistance layer 108 was formed to a thickness of 2000 Å and a layer of Al as the electrode layer 107 was formed to a thickness of 1 μm, whereafter a heat-generating portion (which refers to the gap between the electrodes of the heat-generating resistance layer and will hereinafter be referred to as the heater) array having a shape of 60 μm×100 μm was formed at a pitch of 125 μm by the photolithographic process. Also, as a film for preventing the oxidization of the layer of Ta and preventing the permeation of ink liquid and resisting the mechanical shock caused by bubbles created when the liquid is subjected to heat energy, a layer of $SiO_2$ having a thickness of 0.5 μm and a layer of SiC having a thickness, of 1 μm were successively formed by sputtering to thereby form the protective layer 106.

Subsequently, members for forming the liquid flow paths and the common liquid chamber were formed. The droplet discharge ports 101 were disposed just above the heat acting portions, and these droplet discharge ports 101 were formed by etching a plate of NiCr having a thickness of 30 μm. Further, the liquid supply holes 102 were formed in the base plate 109, and the members for forming the second common liquid chamber, the discharge plate 104, etc. were assembled together, whereby the recording head portion of the liquid injection recording apparatus was made.

In the case of the first embodiment, the width of the liquid flow paths was 70 μm, the height of the liquid flow paths was 50 μm, and the average diameter (hereinafter referred to as the diameter) of the portion So of minimum cross-sectional area of each droplet discharge port 101 was 50 μm.

Ink composed chiefly of a water-soluble black dye, water, diethyleneglycol and 1-3-dimethylene-2-imidazolizinone was used with the first embodiment, a rectangular voltage of 5 μsec. was imparted to the heat-generating resistance layer at a frequency of 1 KHz, and the liquid injection recording apparatus was driven. At this time, the volume of the discharged droplet was $8.71 \times 10^{-5}$ mm³ and A was 1.00. ($A = V/So^{3/2}$; see below).

In the first embodiment, faithful and stable discharge of droplets was effected correspondingly to the inputting of a discharge signal. Also, the apparatus was continuously driven until $1 \times 10^9$ droplets were discharged from each droplet discharge port, and not only the droplets were discharged to the last but also exhibited a stable discharge characteristic to the last. In addition, even for the frequency of 5 KHz or more of the input signal (droplet discharge signal), droplets were discharged sufficiently faithfully and the discharge characteristic thereof was stable. That is, the limit of the droplet forming frequency was 5 KHz or more.

As a second embodiment of the present invention, a recording head portion was made with just the same dimensions as the first embodiment with the exception that the shape of the heat-generating portion was 55 $\mu m \times 55$ $\mu m$ and the diameter of the droplet discharge ports was 40 $\mu m$.

Ink similar to that used with the first embodiment was used with this head, a rectangular voltage of 5 $\mu$sec. was imparted to the heat-generating resistance layer at a frequency of 2 KHz and the head was driven. At this time, the volume of the discharged droplet was $3.30 \times 10^{-5}$ mm$^3$ and A was 0.74.

Again in the second embodiment, as in the first embodiment, faithful and stable discharge of droplets was accomplished correspondingly to the inputting of a discharge signal. Also, even when $1 \times 10^9$ droplets were continuously discharged from each droplet discharge port, droplets having a stable discharge characteristic were discharged to the last without stopping. In addition, even for the frequency of 5 KHz or more of the input signal, stable discharge of droplets was effected sufficiently faithfully to the input signal.

In the recording head of the liquid injection recording apparatus of the construction as shown in FIGS. 1 to 3, the dimensions of various portions were changed. As a result, all of those heads which satisfy formula (1) as shown in Table 1 below led to a very good result, like the first and second embodiments.

comparative example was driven in the same manner as the first embodiment, droplets of a volume of $6.95 \times 10^{-6}$ mm$^3$ were discharged, but again in this case, the discharge of droplets was very unstable and virtually could not be used for image recording. At this time, A was 0.08.

In the above-described embodiments of the present invention, the discharge of droplets is effected by heat energy, but the discharge of droplets may also be effected by mechanical energy.

Also, in each of the above-described embodiments, the droplet discharge ports are of the so-called L discharge type in which liquid is discharged from the liquid flow paths while being bent, but the droplet discharge ports may also be of the type in which such ports are provided at the terminal ends of the liquid flow paths.

Also, it is more preferable to adopt the range of $50 \geqq A \geqq 0.1$ instead of the range of $V/So^{3/2} = A$ in order to achieve the intended purpose more effectively.

A third embodiment will now be described.

In the present embodiment, Si was used for the base plate 109 and the surface of the base plate 109 was first heat-oxidized to form a layer of $SiO_2$ to a thickness of 3 $\mu$m. Subsequently, a layer of Ta having a thickness of 2000 Å was formed as the heat-generating resistance layer 108, and a layer of Al having a thickness of 1 $\mu$m was formed as the electrode layer 107, whereafter a heat-generating portion (heater) array having a shape of 30 $\mu m \times 100$ $\mu$m was formed at a pitch of 125 $\mu$m by the photolithographic process. Also, as a film for preventing the oxidization of the layer of Ta and preventing the permeation of ink liquid and resisting the mechanical shock caused by bubbles created when the liquid is subjected to heat energy, a layer of $SiO_2$ having a thickness of 0.5 $\mu$m and a layer of SiC having a thickness of 1 $\mu$m were successively formed by spattering to thereby form the protective layer 106.

TABLE 1

| Sample No. | Heater Size (μm) × (μm) | Liquid Flow Paths Width (μm) | Liquid Flow Paths Height (μm) | Droplet Discharge Ports Diameter (μm) | Droplet Discharge Ports Thickness (μm) | Droplet Volume (mm³) | A |
|---|---|---|---|---|---|---|---|
| 1 | 20 × 40 | 40 | 30 | 25 | 20 | $1.64 \times 10^{-6}$ | 0.15 |
| 2 | 40 × 40 | 60 | 40 | 40 | 30 | $2.24 \times 10^{-5}$ | 0.50 |
| 3 | 40 × 100 | 60 | 40 | 40 | 30 | $4.77 \times 10^{-5}$ | 1.06 |
| 4 | 30 × 150 | 40 | 50 | 50 | 40 | $1.13 \times 10^{-4}$ | 1.36 |
| 5 | 40 × 200 | 80 | 75 | 50 | 30 | $1.44 \times 10^{-4}$ | 1.73 |
| 6 | 40 × 200 | 60 | 75 | 30 | 30 | $7.00 \times 10^{-5}$ | 3.72 |
| 7 | 30 × 50 | 35 | 25 | 20 | 20 | $1.00 \times 10^{-5}$ | 1.81 |
| 8 | 30 × 50 | 35 | 20 | 20 | 20 | $2.24 \times 10^{-5}$ | 4.07 |
| 9 | 40 × 200 | 50 | 50 | 30 | 30 | $8.71 \times 10^{-5}$ | 4.63 |
| 10 | 50 × 200 | 80 | 80 | 40 | 30 | $6.75 \times 10^{-4}$ | 15.00 |
| 11 | 100 × 150 | 110 | 55 | 30 | 20 | $5.64 \times 10^{-4}$ | 36.00 |
| 12 | 100 × 250 | 110 | 300 | 60 | 30 | $1.64 \times 10^{-3}$ | 50.00 |
| 13 | 80 × 300 | 90 | 200 | 40 | 35 | $7.55 \times 10^{-3}$ | 95.00 |

Next, as a comparative example, a recording head of a construction similar to that of the other embodiments was made with the size of the heat-generating portion of 80 $\mu m \times 200$ $\mu$m, the width of the liquid flow paths of 100 $\mu$m, the height of the liquid flow paths of 125 $\mu$m, the diameter of the droplet discharge ports of 30 $\mu$m, and the thickness of the droplet discharge ports of 20 $\mu$m. When this comparative example was driven in the same manner as the first embodiment, droplets of a volume of $2.0 \times 10^{-3}$ mm$^3$ were discharged, but the discharge was very unstable and stopped immediately. At this time, A was 106.95.

Also, as another comparative example, a recording head similar to the other embodiments was made with the size of the heat generating portion of 30 $\mu m \times 150$ $\mu$m, the width of the liquid flow paths of 80 $\mu$m, the height of the liquid flow paths of 125 $\mu$m, the diameter of the droplet discharge ports of 30 $\mu$m and the thickness of the droplet discharge ports of 20$\mu$. When this Subsequently, members for forming the liquid flow paths and the common liquid chamber were formed. The droplet discharge ports 101 were disposed just above the heat acting portion, and these discharge orifices 101 were formed by etching a plate of NiCr having a thickness of 30$\mu$. Further, the liquid supply holes 102 were formed in the base plate 109, and the members for forming the second common liquid chamber, the discharge plate 104, etc. were assembled together, whereby the recording head portion of the liquid injection recording apparatus was made.

The third embodiment is the recording head as shown in FIGS. 1 to 3 and was formed with the width of the liquid flow paths of 40 μm and the height of the liquid flow paths of 60 μm. The average diameter (hereinafter referred to as the diameter) of the minimum cross-sectional area of each discharge orifice was 30 μm ($So=706.5\ \mu m^2$) and the discharge orifices were formed by etching a plate of NiCr having a thickness of 30 μm and were disposed just above the heater.

When ink composed chiefly of a water-soluble black dye, water, deethyleneglycol and 1,3-dimethyl-2-imidazolizinone was used the liquid injection recording apparatus of the third embodiment and the apparatus was driven with a rectangular voltage of 5 μsec. imparted to the heat-generating resistance layer at a frequency of 1 $KH_z$, droplets were discharged faithfully and stably correspondingly to the input signal (droplet discharge signal). Also, when the apparatus was continuously driven until $1\times10^9$ droplets were discharged, the droplet discharge did not stop to the last and exhibited a stable discharge characteristic.

In the third embodiment, $So=706.5\ \mu m^2$ and hence, $So^{3/2}=18778.8$. Also, in the present embodiment, $S_H=3000$ and therefore, $So^{3/2}$ is between $0.1.S_H=300$ to $100.S_H=300000$. That is, this embodiment satisfied the relation which had been found by the inventors.

Next, ten modifications of the recording head having the same construction as the third embodiment but having the dimensions of various portions thereof changed were prepared. These modifications will hereinafter be referred to as the fourth embodiment, the fifth embodiment, . . . , the thirteenth embodiment. The dimensions of the various portions of the fourth to thirteenth embodiments will be shown in Table 2 below.

These modifications are all within the category of $0.1.S_H \leqq So^{3/2} \leqq 100.S_H$.

Figure 4A:
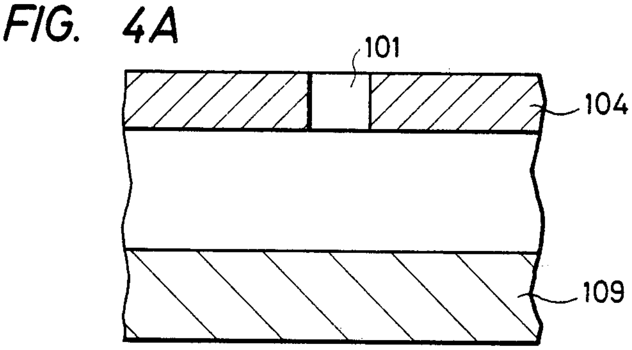
FIGS. 4A to 4C are schematic fragmentary cross-sectional views showing various shapes of the discharge orifice.
Figure 4B:
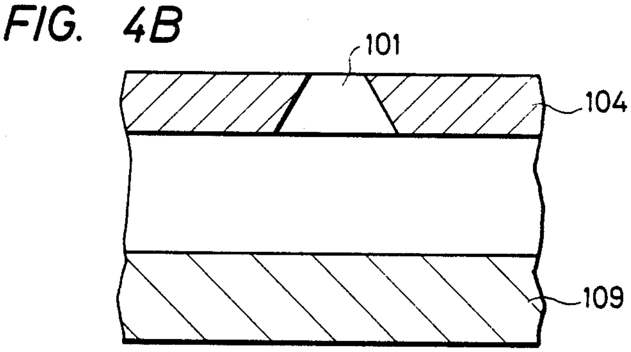
Figure 4C:
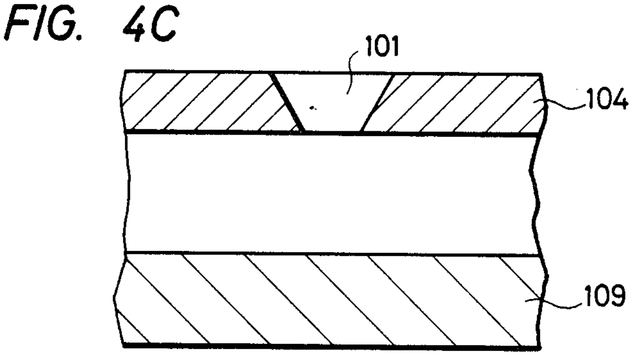

FIGS. 4A to 4C are schematic cross-sectional views schematically showing the shapes of the discharge orifices of the heads of the third to thirteenth embodiments. FIG. 4A shows a discharge orifice of generally constant diameter, FIG. 4B shows a discharge orifice having greater diameters toward the heat acting portion, that is, a tapered discharge orifice, the FIG. 4C shows a discharge orifice having smaller diameters toward the heat acting portion, that is, an inverted tapered discharge orifice.

If the shapes of the discharge orifices as shown in FIGS. 4A to 4C are called 1 , 2 and 3 , respectively, then the shape of the discharge orifices in the third embodiment is 1 .

TABLE 2

| | | Liquid flow paths | | Discharge Orifices | | | |
|---|---|---|---|---|---|---|---|
| Embodiment | Heater Size (μm) × (μm) | Width (μm) | Height (μm) | dia. (μm) | Max. Dia. | Thickness | Shape |
| 4 | 50 × 80 | 50 | 80 | 20 | 60 | 20 | ② |
| 5 | 40 × 200 | 50 | 90 | 35 | ← | 30 | ① |
| 6 | 10 × 50 | 15 | 50 | 15 | ← | 15 | ① |
| 7 | 50 × 50 | 55 | 85 | 25 | 50 | 20 | ② |
| 8 | 40 × 40 | 50 | 60 | 20 | ← | 15 | ① |
| 9 | 30 × 30 | 30 | 50 | 15 | 20 | 15 | ② |
| 10 | 20 × 100 | 25 | 90 | 30 | ← | 15 | ① |
| 11 | 100 × 100 | 125 | 100 | 35 | 80 | 20 | ③ |
| 12 | 180 × 300 | 200 | 150 | 20 | ← | 10 | ① |
| 13 | 30 × 30 | 35 | 20 | 50 | ← | 20 | ① |

When ink similar to that used with the first embodiment was used with the above-described ten embodiments and these embodiments were driven with a rectangular voltage of 5 μsec. applied to the heat-generating resistance layer at a frequency of 1 KHz, stable discharge of droplets was accomplished in all of the ten embodiments. Also, the apparatuses of the respective embodiments were continuously operated as was the third embodiment until $1\times10^9$ droplets were discharged and, again in this case, stable discharge of droplets in conformity with the input signal was effected to the last in any of these, embodiments.

Next, as a first comparative example, a recording head similar in construction to the third embodiment was made with a heater size of 40(μm)×150(μm), the width of the liquid flow paths of 80 μm, the height of the liquid flow paths of 150 μm, the diameter of the discharge orifices of 100 μm ($So=7850\ \mu m^2$), the thickness of the discharge orifices 80 μm and the shape ① of the discharge orifices.

When this comparative example was driven in the same manner as the third embodiment, the vicinity of the discharge orifices was wet with liquid and no droplet was discharged.

Further, as a second comparative example, a recording head similar in construction to the above-described other embodiments was made with a heater size of 80(μm)×160(μm), the width of the liquid flow paths of 100 μm, the height of the liquid flow paths of 120 μm, the diameter of the discharge orifices of 12 μm ($So=113\ \mu m^2$), the maximum diameter of the discharge orifices of 160 μm (the area of 20100 $\mu m^2$), the thickness of the discharge orifices of 15 μm and the shape 2 of the discharge orifices.

When this comparative example was driven under the same conditions as the third embodiment, splash was intense and the discharge of droplets stopped immediately.

In order to carry out the present invention more effectively, it is more desirable to use liquid (ink) having a surface tension preferably of 25–65 dyne/cm, more parferably 30–60 dyne/cm and having a viscosity preferably of 1–20 cp, more preferably of 1–10 cp.

According to the present invention, as described above, there is provided a liquid injection recording method in which the continuous droplet discharging performance is stable and the limit of the droplet forming frequency is high. That is, according to the present invention, there is provided a liquid injection recording method and apparatus which can accomplish recording of excellent image quality.

In the above-described embodiments of the present invention, the discharge orifices are of the so-called L discharge type in which liquid is discharged from the liquid flow paths while being bent, but the discharge orifices may also be of the type in which such orifices are provided at the terminal ends of the liquid flow paths.

However, the present invention can be more effectively adapted for the L-type liquid injection recording apparatus disclosed in German Laid-open Patent Application (OLS) No. 2944005.

What we claim is:

1. A liquid injection recording method comprising:

providing a liquid having a surface tension and viscosity of 25–60 dyne/cm and 1–20 cp, respectively;

effecting recording by providing flying droplets of said liquid in such a manner that the relation between the minimum cross-sectional area So of droplet discharge ports for forming said flying droplets and the volume V of said flying droplets discharged from said droplet discharge ports is $100 \geqq V/So^{3/2} \geqq 0.1$.

* * * * *

UNITED STATES PATENT AND TRADEMARK OFFICE
CERTIFICATE OF CORRECTION

PATENT NO. : 4,675,693

DATED : June 23, 1987

INVENTOR(S) : YASUHIRO YANO, ET AL.

It is certified that error appears in the above-identified patent and that said Letters Patent is hereby corrected as shown below:

AT [57] IN THE ABSTRACT

Line 7, "$0.1.S_H$" should read --$0.1 \cdot S_H$--.
Line 8, "$100.S_H$" should read --$100 \cdot S_H$--.

COLUMN 1

Line 40, "recording," should read --recording--.
Line 41, "recording" should read --recording,--.
Line 53, "uses" should read --use--.

COLUMN 2

Line 50, "a" should read --an--.

COLUMN 3

Line 11, "stably" should read --stable--.

COLUMN 4

Line 7, "are" should read --is--.
Line 32, "thickness," should read --thickness--.
Line 60, "1.00." should read --1.00--.
Line 66, "the" should read --were--.
Line 67, "droplets were" should read --the droplets--.

COLUMN 6

Line 56, "spattering" should read --sputtering--.

UNITED STATES PATENT AND TRADEMARK OFFICE

CERTIFICATE OF CORRECTION

PATENT NO. : 4,675,693
DATED : June 23, 1987
INVENTOR(S) : YASUHIRO YANO, ET AL.

It is certified that error appears in the above-identified patent and that said Letters Patent is hereby corrected as shown below:

COLUMN 7

Line 11, "deethyleneglycol" should read --diethyleneglycol--.
Line 24, "$0.1.S_H$" should read --$0.1 \cdot S_H$--.
Line 25, "$100.S_H$" should read --$100 \cdot S_H$--.
Line 36, "$0.1.S_H \leq So^{3/2} \leq 100.SH.$" should read --$0.1 \cdot S_H \leq So^{3/2} \leq 100 \cdot SH.$--

Line 48, "1 , 2 and 3 ," should read

--①, ② and ③,--.

Line 50, " 1 ." should read --①.--.

UNITED STATES PATENT AND TRADEMARK OFFICE
CERTIFICATE OF CORRECTION

PATENT NO. : 4,675,693.

DATED : June 23, 1987

INVENTOR(S) : YASUHIRO YANO, ET AL.

It is certified that error appears in the above-identified patent and that said Letters Patent is hereby corrected as shown below:

COLUMN 8

Line 8, "these," should read --these--.
Line 29, "shape 2 " should read --shape ② --.
Line 38, "parferably" should read --preferably--.

Signed and Sealed this

Twentieth Day of October, 1987

*Attest:*

DONALD J. QUIGG

*Attesting Officer*

*Commissioner of Patents and Trademarks*